United States Patent
Hebiguchi

[11] Patent Number: 6,091,473
[45] Date of Patent: Jul. 18, 2000

[54] ACTIVE MATRIX LIQUID CRYSTAL DISPLAY

[75] Inventor: Hiroyuki Hebiguchi, Miyagi-ken, Japan

[73] Assignee: Alps Electric Co., Ltd., Tokyo, Japan

[21] Appl. No.: 09/082,705

[22] Filed: May 21, 1998

[30] Foreign Application Priority Data

May 22, 1997 [JP] Japan ..................................... 9-132605

[51] Int. Cl.$^7$ .......................... G02F 1/136; G02F 1/1343
[52] U.S. Cl. ........................... 349/141; 349/38; 349/138; 349/43
[58] Field of Search .................................. 349/38, 39, 42, 349/43, 110, 111, 141, 143, 138

[56] References Cited

U.S. PATENT DOCUMENTS

| | | | |
|---|---|---|---|
| 5,598,285 | 1/1997 | Kondo et al. | 349/141 |
| 5,852,485 | 12/1998 | Shimada et al. | 349/141 |
| 5,907,379 | 5/1999 | Kim et al. | 349/141 |

FOREIGN PATENT DOCUMENTS

| | | |
|---|---|---|
| 6-148596 | 4/1994 | Japan . |
| 8-190104 | 7/1995 | Japan . |
| 9-146125 | 6/1997 | Japan . |

*Primary Examiner*—James A. Dudek
*Assistant Examiner*—Tai V. Duong
*Attorney, Agent, or Firm*—Brinks Hofer Gilson & Lione

[57] ABSTRACT

To provide a liquid crystal display which enables the enhancement of the numerical aperture with a characteristic of a wide angle of visibility provided in constitution for driving liquid crystal by a lateral electric field, the present invention is characterized in that liquid crystal is arranged between a pair of substrates, plural gate wirings and plural source wirings are provided mutually perpendicularly on the opposite surface of either of the above substrates, a thin film transistor is provided in the vicinity of each intersection of the above gate wiring and the above source wiring, a pixel electrode driven by the thin film transistor and a common electrode for applying a lateral electric field to the liquid crystal in a direction along the above substrate surface in cooperation with the above each pixel electrode and forming plural pixel electrodes are provided, insulating layers are provided between the common electrode and the gate wiring and an electrode part along the gate wiring of the common electrode is provided in the vicinity of the gate wiring.

6 Claims, 10 Drawing Sheets

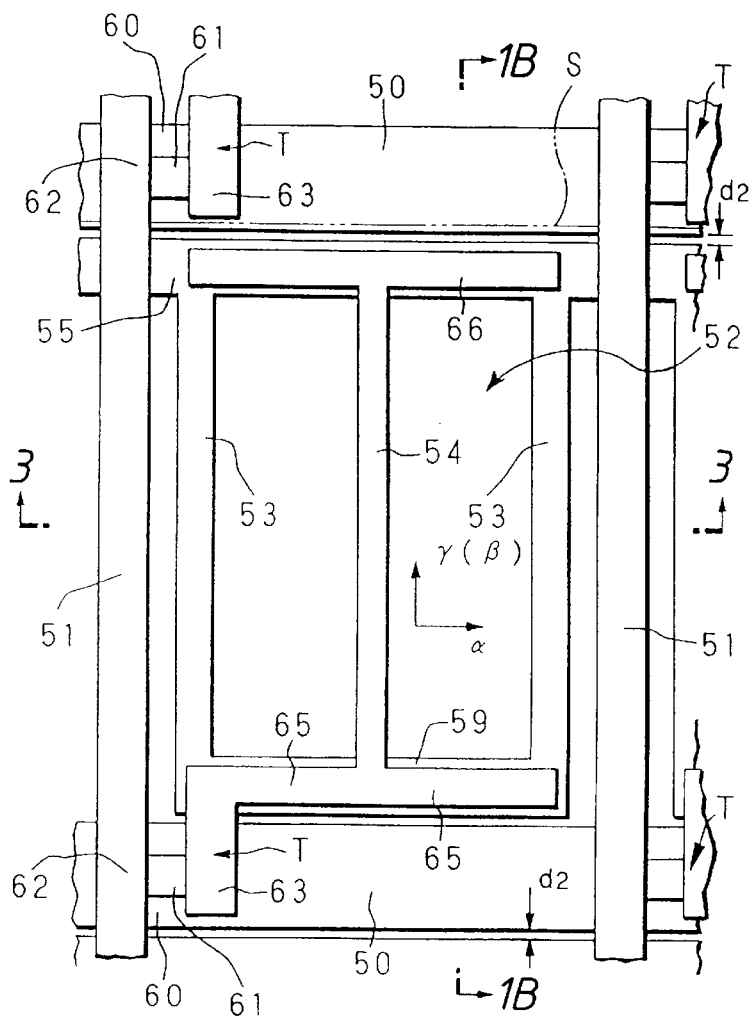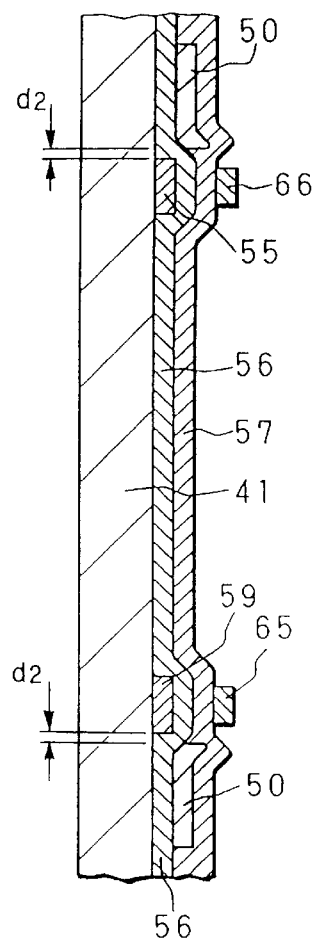

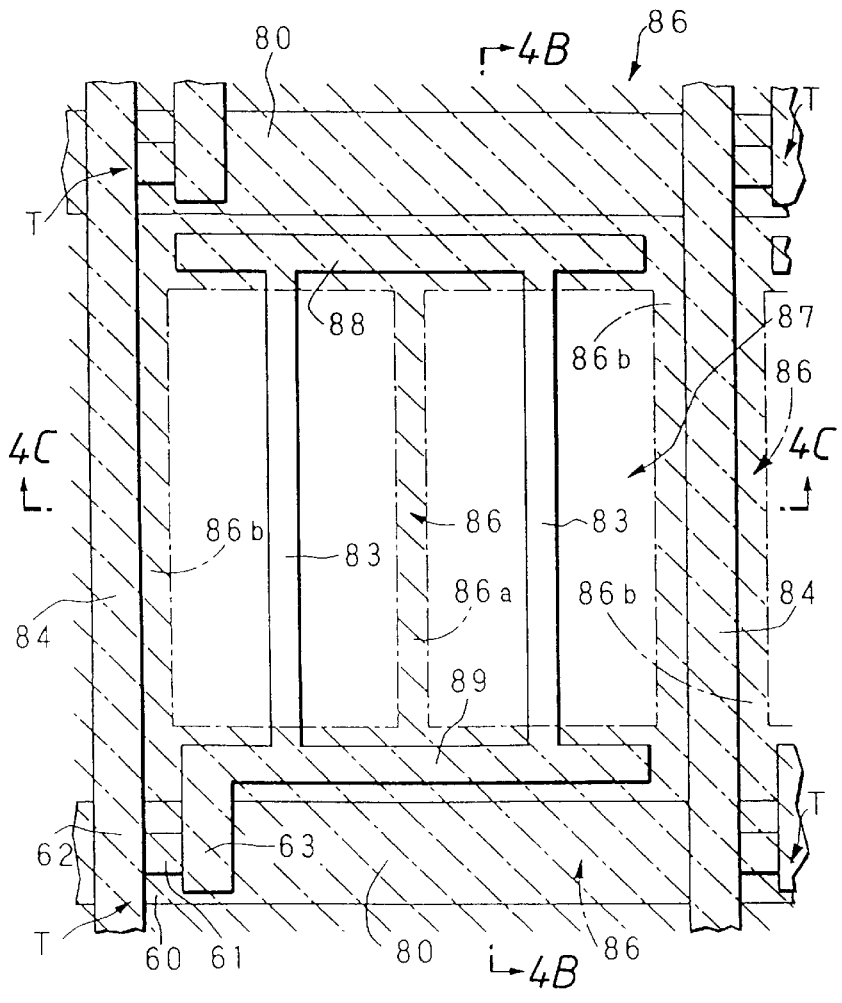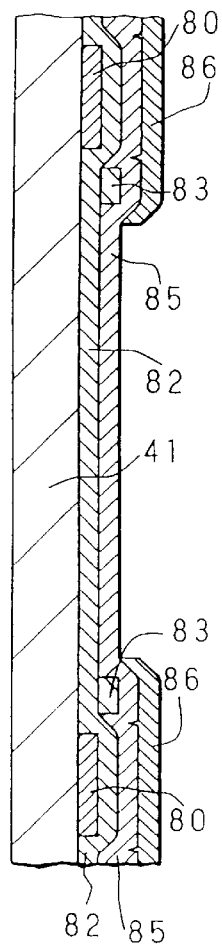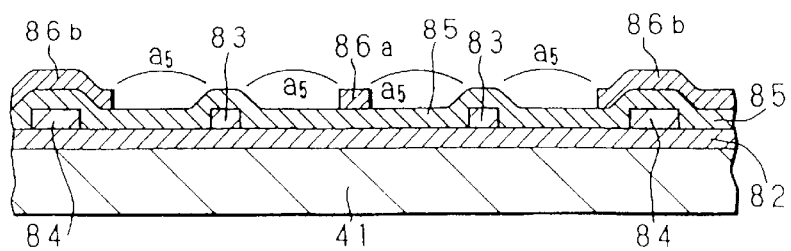

OFF STATE IN VOLTAGE (DARK STATE)

ON STATE IN VOLTAGE (LIGHT STATE)

ACTIVE MATRIX LIQUID CRYSTAL DISPLAY

BACKGROUND OF THE INVENTION

The present invention relates to an active matrix liquid crystal display which controls the orientation of liquid crystal by applying a lateral electric field in a direction along the surface of a substrate and particularly, relates to structure which enables the enhancement of the numerical aperture.

Recently, there is a problem in a twisted nematic (TN) mode liquid crystal display that dependency upon the angle of visibility is high because vertical visibility is poor though horizontal visibility is relatively good. Therefore, the applicants of the present invention formerly developed a liquid crystal display provided with structure which enabled the solution of such a problem.

According to technique for solving the problem, an electrode for driving liquid crystal is not respectively provided to the upper and lower substrates which holds a liquid crystal layer between them but two types of linear electrodes 12 and 13 with different poles are provided only to the lower substrate 11 with the above electrodes mutually separated as shown in FIG. 10, no electrode is provided to the upper substrate 10 shown in FIG. 10 and liquid crystal molecules 36 can be oriented in the direction (the direction of the surface of the substrate) of a lateral electric field generated between both linear electrodes 12 and 13 by applying voltage.

That is, as shown in FIG. 9, a comb-type electrode 16 is constituted by connecting each linear electrode 12 to a base line part 14, a comb-type electrode 17 is constituted by connecting each linear electrode 13 to a base line part 15, both comb-type electrodes 16 and 17 are combined, a switching element 19 is connected to the base line part 14 and a power source 18 is connected to the base line part 15.

As shown in FIG. 11A, a polarizing plate provided with the polarization direction of a direction β shown in FIG. 11A is laminated on the upper substrate 10 by forming an orientation film on the liquid crystal side of the upper substrate 10 and applying orientation processing to the orientation film so that liquid crystal molecules 36 are arranged in the direction of β, and a polarizing plate provided with the polarization direction of a direction α is laminated on the lower substrate 11 by forming an orientation film on the liquid crystal side of the lower substrate 11 and applying orientation processing to the orientation film so that liquid crystal molecules 36 are arranged in the direction of γ parallel to the above direction β.

According to the above constitution, liquid crystal molecules 36 are homogeneously oriented in the same direction in the orientation direction of the orientation films as shown in FIGS. 11A and 11B in a state in which no voltage is applied between the linear electrodes 12 and 13. Back light which passes the lower substrate 11 in this state is polarized in the direction of α by the polarizing plate, as the back light is transmitted in the layer of liquid crystal molecules 36 as it is and reaches the polarizing plate with a different polarization direction β of the upper substrate 10, it is interrupted by the polarizing plate and as no back light passes a liquid crystal display, the liquid crystal display is in a dark state.

Next, when voltage is applied between the linear electrodes 12 and 13, liquid crystal molecules 36 are twistedly oriented as shown in FIGS. 12A and 12B. In this state, the polarization direction of light transmitted in the lower substrate 11 and polarized in the direction of a is converted by the twisted liquid crystal molecules 36, the light can pass through the upper substrate 10 provided with the polarizing plate with the polarization direction β different from the direction α and the liquid crystal display is in a light state.

FIGS. 13A, 13B and 13C show the structure of a liquid crystal display provided with the linear electrodes 12 and 13 provided with the above structure in case the structure of the liquid crystal display is applied to an actual active matrix liquid crystal driving circuit.

FIG. 13A shows the planar structure of each electrode, FIGS. 13B and 13C show the sectional structure, gate wirings 21 and source wirings 22 arranged in a matrix on a substrate 20 are formed on/over the transparent substrate 20 via an insulating layer 24 between them and a part equivalent to each rectangular area surrounded by the gate wirings 21 and the source wirings 22 is a pixel area. Further, a gate electrode 21a composed of a part of the gate wiring 21 is formed at the corner of each pixel area, a semiconductor layer 26 is formed on the insulating layer 24 on the gate electrode 21a and a thin film transistor T is constituted by a source electrode 27 and a drain electrode 28 on both sides of the semiconductor layer 26.

A common wiring 30 is provided next to the gate wiring 21 on the substrate 20 so that the common wiring passes each pixel area and common electrodes 31 are provided in a part equivalent to each pixel area of each common wiring 30 so that the common electrode is adjacent to the source wiring 22 located on both sides of each picture element and the ends of the common electrodes 31 are connected by a common electrode connection 32 provided along the gate wiring 21 on the end side of the common electrode 31.

Further, the drain electrode 28 provided to the thin film transistor T is connected to a capacity generating electrode 33 extended on the upper side of the common electrode connection 32, the capacity generating electrode 33 is connected to a pixel electrode 34 provided in the middle of the common electrodes 31, the pixel electrode 34 is extended to the side of the common wiring 30 and is connected to a capacity generating electrode 35 formed on the common wiring 30.

In the structure shown in FIGS. 13A to 13C, as a lateral electric field can be let to act so that a line of electric force is formed in a direction shown by a dotted arrow a in FIG. 13C, liquid crystal molecules can be oriented according to the lateral electric field. Therefore, a light state and a dark state can be switched by controlling the orientation of liquid crystal as in the case described above, referring to FIGS. 11 and 12.

However, the liquid crystal display provided with the above structure has a problem that the numerical aperture is often small though the display has an advantage that the angle of visibility is large.

That is, in the structure shown in FIGS. 13A to 13C, the orientation of liquid crystal molecules is controlled by a lateral electric field generated between the pixel electrode 34 and each common electrode 31. However, since the gate wiring 21 and the common wiring 30 are both directly formed on the substrate 20 as shown in FIGS. 13B and 13C and located in the same plane, fixed space $d_1$ is required to be left between the gate wiring 21 and the common wiring 30 to prevent a short circuit in wiring as shown in FIGS. 13A and 13B. Because the space $d_1$ may be probably a defective part in which the leakage of light and others are caused, the space is required to be covered with a black matrix and others and therefore, a numerical aperture as a liquid crystal display cannot be enhanced. As the orientation of an electric field applied to a liquid crystal molecule is different from that of a lateral electric field in each area over the common electrodes 31, the orientation of liquid crystal molecules 36 is different from that of an area between the pixel electrode 34 and the common electrode 31 as shown in FIG. 10.

Therefore, heretofore, as an area over the common electrode 31 may cause a problem such as the leakage of light, structure that the area is covered with a black matrix is adopted and further, structure that the periphery of a part covered with a black matrix is located slightly inside the inner edge of each common electrode 31 is adopted, therefore, an area covered with a black matrix is widened and there is a problem that a numerical aperture as a liquid crystal display cannot be enhanced.

SUMMARY OF THE INVENTION

The present invention is made in view of the above situation and the object is to provide a liquid crystal display which enables the enhancement of the numerical aperture with a characteristic that the angle of visibility is large in constitution that liquid crystal is driven by a lateral electric field provided.

To solve the above problems, the present invention is characterized in that liquid crystal is arranged between a pair of substrates, plural gate wirings and plural source wirings are provided mutually perpendicularly on the opposite surface of either of the above substrates, a thin film transistor is provided in the vicinity of each intersection of the gate wiring and the source wiring, a pixel electrode driven by the thin film transistor and a common electrode for applying a lateral electric field to the above liquid crystal in a direction along the above substrate in cooperation with the pixel electrodes and forming plural pixel electrodes are provided, an insulating layer is provided between the common electrode and the above a gate wiring and an electrode part along the gate wiring of the common electrode is provided in the vicinity of the gate wiring.

As in the above structure, a lateral electric field can be applied to liquid crystal by the common electrode and the pixel electrode respectively provided on the substrate, the orientation of liquid crystal can be controlled by applying a lateral electric field or not applying it and hereby, a light state and a dark state can be switched.

Further, as the gate wiring and the common electrode are provided in separate layers on the substrate via an insulating layer, the gate wiring and the common electrode can be arranged closer, compared with those in conventional type structure which is structure in the same layer and hereby, as an interval in a plan between the gate wiring and the common electrode can be reduced, a numerical aperture as a liquid crystal display can be enhanced.

Next, the liquid crystal display according to the present invention may be also constituted so that the present invention is characterized in that the gate wiring is provided on the upper side of the common electrode, the above pixel electrode is provided on the gate wiring via a second insulating layer and an electrode part along the gate wiring of the pixel electrode is overlapped with an electrode part along the gate wiring of the common electrode.

The liquid crystal display according to the present invention may be also constituted so that the present invention is characterized in that the gate wiring is provided on the upper side of the common electrode, the pixel electrode is provided on the gate wiring via the second insulating layer and an electrode part along the source wiring of the pixel electrode is overlapped with an electrode part along the source wiring of the common electrode.

According to the above structures, as capacity can be secured in a part between the pixel electrode part and the common electrode part respectively along the gate wiring or a part between the pixel electrode part and the common electrode part respectively along the source wiring, such capacity can be utilized for the improvement of the liquid crystal driving performance of the liquid crystal display as storage capacity.

Next, the present invention is characterized in that liquid crystal is arranged between a pair of substrates, plural gate wirings and plural source wirings are provided mutually perpendicularly on the opposite surface of either of the above substrates, a thin film transistor is provided in the vicinity of each intersection of the gate wiring and the source wiring, a pixel electrode driven by the thin film transistor and a common electrode for applying a lateral electric field to the liquid crystal in a direction along the surface of the substrate in cooperation with the pixel electrodes to form plural pixel electrodes are provided, an insulating layer is provided between the common electrode and the gate wiring and a part overlapped with the gate wiring is formed in an electrode part along the gate wiring of the common electrode.

According to the above structure, as the part overlapped with a part of the gate wiring is provided to a part of the common electrode, the part of the common electrode can be arranged further closer to the gate wiring in a plan and as the area of the common electrode in a pixel area can be further reduced than that in the above each structure, the numerical aperture can be enhanced.

Next, the liquid crystal display according to the present invention can be constituted so that the present invention is characterized in that in the above structure, two isolating layers are provided, the pixel electrode is provided between the upper isolating layer and the lower isolating layer and a part overlapped with the gate wiring is formed in an electrode part along the gate wiring of the pixel electrode.

Further, the liquid crystal display according to the present invention may be also constituted so that two isolating layers are provided as described above, the pixel electrode is provided between the upper isolating layer and the lower isolating layer and an electrode part along the gate wiring of the pixel electrode is overlapped with an electrode part along the gate wiring of the common electrode.

As a part overlapped with the gate wiring or an electrode part along the gate wiring of the common electrode is provided, capacity can be secured by the overlapped part and such capacity can be utilized for the improvement of the liquid crystal driving performance of the liquid crystal display as storage capacity.

BRIEF DESCRIPTION OF THE DRAWINGS

FIGS. 1A and 1B show a first embodiment of a liquid crystal display according to the present invention, in which FIG. 1A is a plan showing a thin film transistor arrayed substrate and FIG. 1B is a sectional view viewed along a line 1B—1B in FIG. 1A;

FIGS. 4A to 4C show a second embodiment of the liquid crystal display according to the present invention, in which FIG. 4A is a plan showing a thin film transistor arrayed substrate, FIG. 4B is a sectional view viewed along a line 4B—4B in FIG. 4A and FIG. 4C is a sectional view viewed along a line 4C—4C in FIG. 4A;

FIGS. 6A to 6C show a fourth embodiment of the liquid crystal display according to the present invention, in which FIG. 6A is a plan showing a thin film transistor arrayed substrate, FIG. 6B is a sectional view viewed along a line 6B—6B in FIG. 6A and FIG. 6C is a sectional view viewed along a line 6C—6C in FIG. 6A;

FIGS. 8A to 8C show a sixth embodiment of the liquid crystal display according to the present invention, in which FIG. 8A is a plan showing a thin film transistor arrayed substrate, FIG. 8B is a sectional view viewed along a line 8B—8B in FIG. 8A and FIG. 8C is a sectional view viewed along a line 8C—8C in FIG. 8A;

DESCRIPTION OF THE PREFERRED EMBODIMENTS

Figure 2:
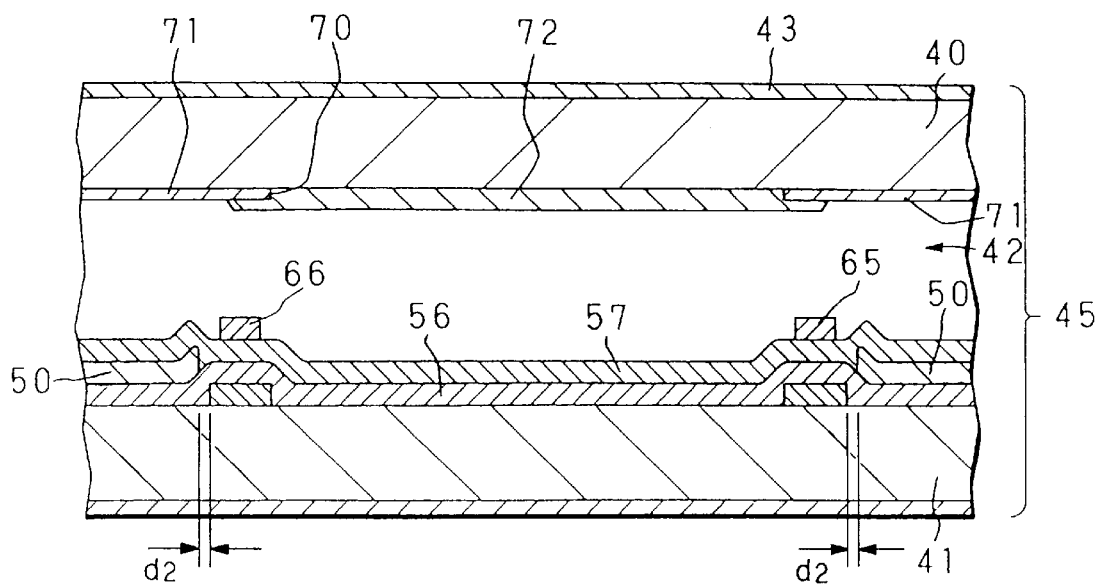
FIG. 2 is a sectional view showing the main part of the liquid crystal display equivalent to the first embodiment.

Referring to the drawings, a first embodiment of the present invention will be described below.

Figure 3:
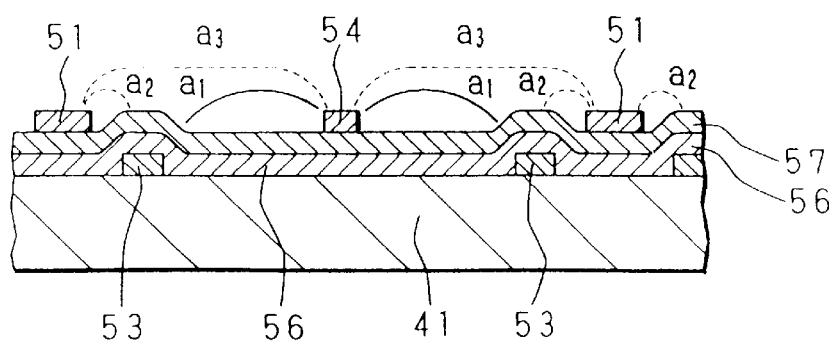
FIG. 3 is a sectional view viewed along a line 3—3 in FIG. 1A.

FIGS. 1 to 3 show a first embodiment of a liquid crystal display according to the present invention, an upper substrate 40 and a lower substrate 41 are arranged opposite in parallel at a predetermined interval (a cell gap) between the upper and lower substrates as shown in sectional structure in FIG. 2, liquid crystal 42 is provided between the substrates 40 and 41 and polarizing plates 43 and 44 are arranged on the outside surface of each substrate 40 and 41.

These substrates 40 and 41 are composed of a transparent substrate such as glass, however, in actual constitution, the periphery of each substrate 40 and 41 is surrounded by sealant, space surrounded by the substrates 40 and 41 and the sealant is filled with liquid crystal 42 and a liquid crystal cell 45 is constituted by combining the substrates 40, 41, the liquid crystal 42, the polarizing plates 43 and 44.

In structure in this embodiment, plural gate wirings 50 and plural source wirings 51 are formed on the transparent substrate 41 in a matrix as shown in FIG. 1A, and linear common electrodes 53 and a linear pixel electrode 54 are arranged in parallel in a pixel area 52 surrounded by the gate wirings 50 and the source wirings 51.

More detailedly, plural common electrode wirings 55 for constituting a part of each common electrode are formed on the lower substrate 41 in parallel at a predetermined interval, a first isolating layer 56 composed of $SiO_2$, $SiN_x$ and others such as an insulating layer is formed with the first isolating layer covering the substrate 41 and the common electrode wirings 55, the gate wiring 50 wider than the common electrode wiring 55 is provided next to the common electrode wiring 55 on the isolating layer 56 in parallel with the common electrode wiring 55 at a minute interval of approximately 0.5 to 2.0 $\mu$m, a second isolating layer 57 such an insulating layer is formed on the first isolating layer 56 with the second isolating layer covering each gate wiring 50, and the pixel electrode 54 and the source wiring 51 are formed on the isolating layer 57.

The common electrodes 53 extended from the common electrode wiring 55 are formed in parallel with the source wirings 51 located on both sides of the common electrode wiring 55 for each pixel area 52 and are connected via the common electrode connection 59 provided next to the gate wiring 50 in a position close to the gate wiring 50 on the other end side (on the lower side in FIG. 1A) of each common electrode.

In the meantime, a thin film transistor T is constituted by forming a gate electrode 60 using a part of the gate wiring 50 in a part in which the gate wiring 50 and the source wiring 51 are crossed in each pixel area 52, forming a semiconductor layer 61 on the isolating layer 57 on the gate electrode 60, connecting a source electrode 62 using a part of the source wiring 51 to one side of the semiconductor layer 61 and connecting a drain electrode 63 to the other side.

Next, the above pixel electrode 54 is arranged in parallel with the common electrodes 53 in the middle of the common electrodes 53 on both sides of each pixel area 52, a capacity generating electrode 65 over the common electrode connection 59 is formed on one side of the pixel electrode 54, the isolating layers 56 and 57 are provided between the common electrode connection 59 and the capacity generating electrode 65 so that capacity is secured and one end of the capacity generating electrode 65 is connected to the drain electrode 63.

Next, a capacity generating electrode 66 over the common electrode wiring 55 is formed on the other side of the pixel electrode 54 in each pixel area 52 and the isolating layers 56 and 57 are provided between the common electrode wiring 55 and the capacity generating electrode so that capacity is secured. Capacity generated by these capacity generating electrodes 65 and 66 functions as the removal of the effect of parasitic capacity when liquid crystal is driven and storage capacity for holding signal voltage.

An orientation film is provided on/over the isolating layer 57, the pixel electrode 54 and the source wiring 51, however, the film is omitted in sectional structure shown in FIG. 2.

The electrodes 53 and 54 used in structure in this embodiment may be also formed by either a shading metallic electrode or a transparent electrode. However, if a normal black type display described later is adopted, it is desirable that the electrodes are a transparent electrode composed of indium tin oxide (ITO) and others.

Next, as shown in FIG. 2, a black matrix 71 provided with an opening 70 corresponding to the pixel area 52 provided on the side of the lower substrate 41 is provided on the lower surface side of the upper substrate 40, each opening 70 is covered with a color filter 72 and an orientation film not shown is provided while covering the black matrix 71 and the color filter 72. The above black matrix 71 is composed of a shading metallic film such as a chromium layer or a lamination of a chromium oxide layer and a chromium layer, covers a part which does not contribute to display of each pixel area 52 provided on the side of the lower substrate 41 and is formed so that the black matrix 71 covers a part which does not contribute to display of each pixel area 52, for example the gate wiring 50, the common electrode wiring 55, the source wiring 51, the common electrode 53, the common electrode connection 59 and the vicinity of them. An orientation film is provided on the respective lower surface sides of the black matrix 71 and the color filter 72. However, the film is omitted in the sectional structure shown in FIG. 1.

In the case of a liquid crystal display for color display, the color filter 72 is provided as shown in FIG. 2 and each color of red (R), green (G) and blue (B) of the color filter is arranged every pixel area 52, however, in the case of a liquid crystal display which is not for color display, it is natural that the color filter 72 may be omitted.

Further, in the liquid crystal display in this embodiment, orientation processing is applied to an orientation film on the side of the upper substrate 40 and an orientation film on the side of the lower substrate 41 in an approximately parallel direction with the longitudinal direction of the common electrode 53.

Molecules of liquid crystal 42 existing between the substrates 40 and 41 are homogeneously arrayed by the above orientation processing in a state in which the longer axis of each liquid crystal molecule is directed in the longitudinal direction of the common electrode 53 (in a state in which the longer axis is directed in a direction γ shown in FIG. 1A) in a state in which an electric field is not applied.

In the structure in this embodiment, the polarizing axis of the upper polarizing plate 43 is directed in an approximately parallel direction with the longitudinal direction of the common electrode 53, and the polarizing axis of the lower polarizing plate 44 is directed in a perpendicular direction (in a lateral direction in FIG. 1A, that is, in a direction α) to the longitudinal direction of the common electrode 53.

In the above structure according to the present invention, a light state and a dark state can be switched by switching whether voltage is applied between each common electrode 53 and the pixel electrode 54 in a desired pixel area 52 or not by the operation of the thin film transistor T which is a switching device.

Figure 12A:
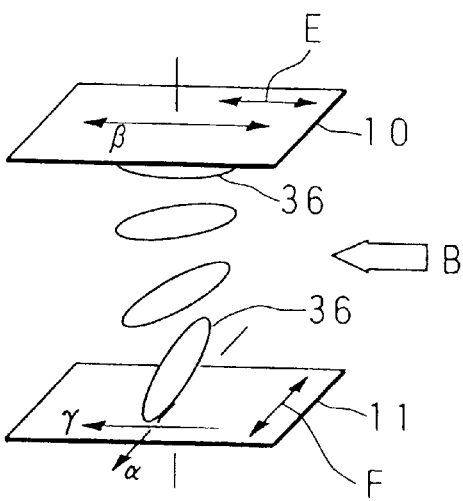
FIG. 12A shows the orientation of liquid crystal in a light state of the liquid crystal display developed formerly and according to the method of applying a lateral electric field and FIG. 12B is a side view of FIG. 12A.
Figure 12B:
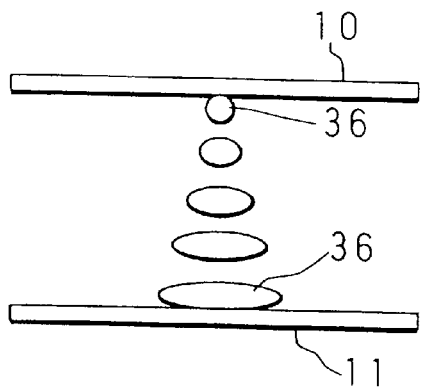

That is, a lateral electric field can be applied in a direction $a_1$ shown in FIG. 3 by applying voltage between each common electrode 53 and the pixel electrode 54 provided in a pixel area 52 in a desired position by operating the thin film transistor T. Accordingly, as in the case described referring to FIGS. 12A and 12B, liquid crystal molecules can be twisted by 90° between the upper and lower substrates to thereby obtain a light state.

Figure 11A:
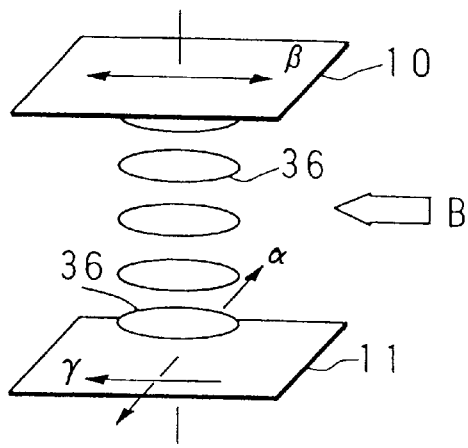
FIG. 11A shows the orientation of liquid crystal in a dark state of the liquid crystal display developed formerly and according to the method of applying a lateral electric field and FIG. 11B is a side view of FIG. 11A.
Figure 11B:
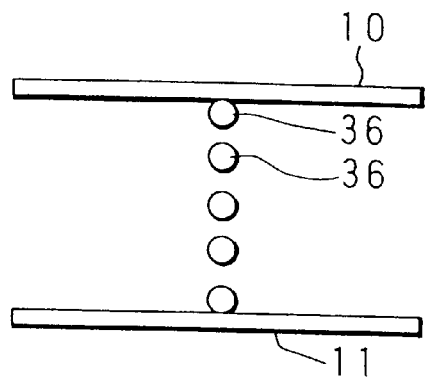

Liquid crystal molecules can be homogeneously oriented in the same direction as the direction of the orientation film in the orientation processing in the case shown in FIGS. 11A and 11B by not applying voltage between each common electrode 53 and the pixel electrode 54, whereby a dark state can be obtained.

Therefore, as described above, the orientation of liquid crystal molecules can be controlled and a dark state and a light state can be obtained by switching whether the light of a back light provided on the lower side of the substrate 41 is interrupted or transmitted depending upon the orientation controlled state of liquid crystal molecules. In this embodiment, as a state in which the orientation of liquid crystal molecules is not controlled is a dark state and a state in which the orientation of liquid crystal molecules is controlled is a light state, a display format called normal black is adopted. As the orientation of liquid crystal molecules is controlled with the molecules homogeneously oriented or twisted by 90° between both substrates 40 and 41, a liquid crystal display with a large angle of visibility in which the variation of transmissivity depending upon the angle of visibility is small can be obtained.

In the structure in this embodiment, the gate wiring 50 and the common electrode wiring 55 are adjacent via a minute interval $d_2$ in a plan shown in FIG. 1A, however, as both are provided in separate layers via the isolating layer 56 such as an insulating layer, insulation performance between both is secured by the isolating layer 56 even if an interval between both is hardly made when viewed from the top or even if both are slightly overlapped to the extent that parasitic capacity does not come into question. Therefore, as shown in FIGS. 1A and 1B, the interval $d_2$ between the gate wiring 50 and the common electrode wiring 55 can be reduced so that the interval is smaller than the interval $d_1$ between the gate wiring 21 and the common electrode wiring 30 in the conventional type structure shown in FIG. 13B and as a result, distance between the common electrode wiring 55 and the common electrode connection 59 on the opposite side can be increased. In other words, the area of the pixel area 52 to be covered with a black matrix can be reduced, the numerical aperture can be enhanced, driving voltage showing maximum transmissivity as a liquid crystal display can be reduced and driving by saved power is enabled.

Further, if the gate wiring 50 and the common electrode wiring 55 are slightly overlapped to the extent that parasitic capacity does not come into question, the position of one side of the common electrode wiring 55 is shown by a two-dot chain line S in FIG. 1A. However, even in this case, as the position of the common electrode wiring 55 can be moved more on the side of the gate wiring 50 than that in the structure shown in FIGS. 13A to 13C, the numerical aperture can be enhanced. The extent that parasitic capacity does not come into question in case the gate wiring 50 and the common electrode wiring 55 are overlapped means a range of approximately 0 to 3 μm. However, as effect by parasitic capacity is reduced in case measures for driving such as the optimization of common voltage are taken, the above extent is not limited to the above range.

Next, capacity can be secured between a capacity generating electrode 65 and the common electrode connection 59 and between a capacity generating electrode 66 and the common electrode wiring 55 by providing the capacity generating electrodes 65 and 66 and providing the common electrode wiring 55 and the common electrode connection 59 so that both are respectively opposite to the capacity generating electrodes via the isolating layers 56 and 57, and the above capacity can be utilized for the improvement of the liquid crystal driving performance of the liquid crystal capacity as storage capacity.

Next, in the structure in this embodiment, if potential difference is applied between each common electrode 53 and the pixel electrode 54 and a lateral electric field is generated as shown by $a_1$ in FIG. 3, a lateral electric field shown by a chain line $a_2$ in FIG. 3 is generated between the source wiring 51 and the common electrode 53, a lateral electric field shown by a chain line $a_3$ in FIG. 3 is generated between the source wiring 51 and the pixel electrode 54 and the lateral electric field $a_1$ for display may be influenced, however, these extra lateral electric fields can be removed in structure in a second embodiment or the succeeding described next.

FIGS. 4A to 4C show the main part of a liquid crystal display equivalent to a second embodiment of the present invention and as in FIGS. 4A to 4C and as the same reference numbers are allocated to the same parts as in the liquid crystal display equivalent to the first embodiment shown in FIGS. 1 to 3, the description of them is omitted.

The liquid crystal display equivalent to this embodiment is different from the liquid crystal display equivalent to the first embodiment in that gate wirings 80 are formed on the lower substrate 41, a first isolating layer 82 such as an insulating layer is provided covering the substrate 41 and these gate wirings 80, a pixel electrode 83 and a source wiring 84 are formed on the isolating layer 82, a second isolating layer 85 such as an insulating layer is provided covering the isolating layer 82, the pixel electrode 83 and the source wiring 84, and a common electrode 86 is provided on the isolating layer 85.

Further, in this embodiment, two pixel electrodes 83 are provided apart in parallel with the source wirings 84 in a pixel area 87 surrounded by the gate wirings 80 and the source wirings 84 as shown in FIG. 4A, each one end of the pixel electrodes 83 is connected to a capacity generating electrode 88 on the same one side provided next to and in parallel with the gate wiring 80 on the same one side, each other end of the pixel electrodes is connected to a capacity generating electrode 89 on the other side provided next to and in parallel with the gate wiring 80 on the other side and the capacity generating electrode 89 is connected to the drain electrode 63 of a thin film transistor T. A common electrode 86 is composed of an electrode part 86a provided in parallel with the pixel electrodes 83 between them and a shading part 86b formed so that a part except the pixel area 87 can be covered.

Specifically, the shading part 86b is provided so that it covers the source wirings 84 and the vicinity, the gate wiring 80 and the vicinity, the thin film transistor T and the vicinity, the capacity generating electrodes 88 and 89 and the vicinity, and a central part of the pixel area 87 can be opened.

In the structure in this embodiment, as a lateral electric field shown by a full line $a_5$ can be generated between the pixel electrode 83 and the common electrode 86 as shown in FIG. 4C when potential difference is applied between each pixel electrode 83 and the common electrode 86, the orientation of liquid crystal can be controlled as in the structure in the first embodiment and the liquid crystal display equivalent to the second embodiment can be used for a liquid crystal display by switching dark display and light display.

Further, in the structure in this embodiment, as the common electrode 86 covers the source wiring 84 and an electric field leaking from the source wiring 84 can be shielded, the electric field of the source wiring 84 has no effect upon an electric field between the shading part 86b and the pixel electrode 83 as shown in FIG. 4C. Therefore, in the structure in the first embodiment, an area which is influenced by the leakage electric field of the source wiring 51 and the orientation of which may be disordered is required to be covered with the black matrix 71. However, in the structure in this embodiment, an area to be covered with a black matrix can be reduced and therefore, a numerical aperture as a liquid crystal display can be enhanced.

Figure 13A:
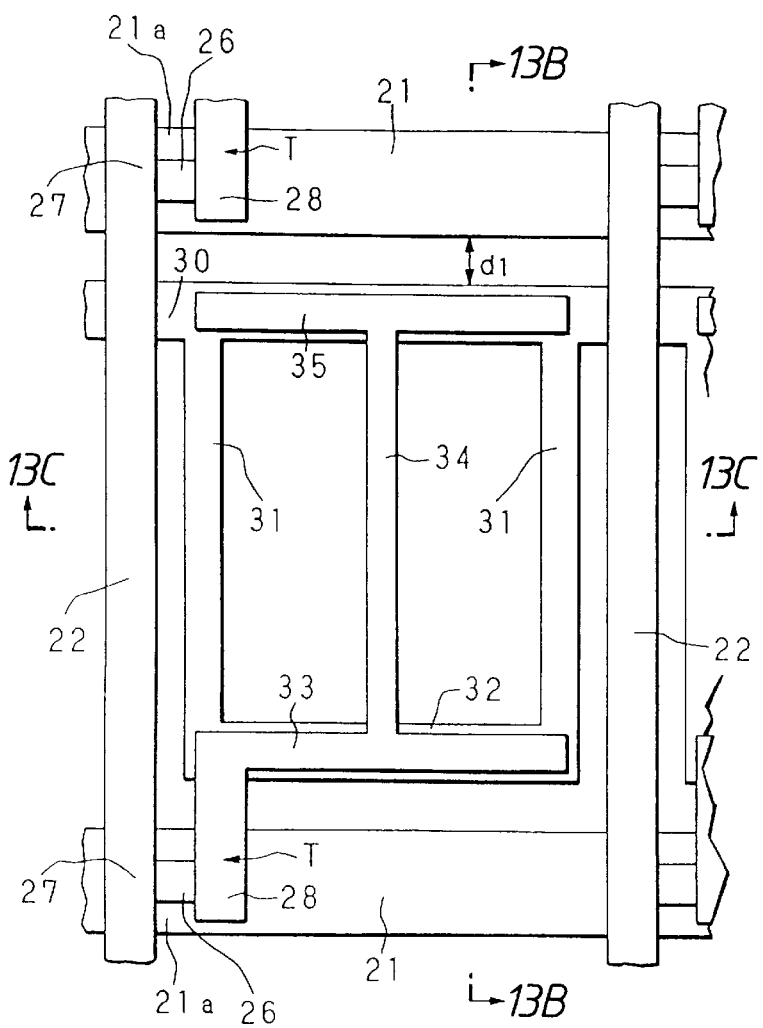
FIG. 13A shows the sectional structure in an example in which the liquid crystal display developed formerly and according to the method of applying a lateral electric field is embodied.
Figure 13B:
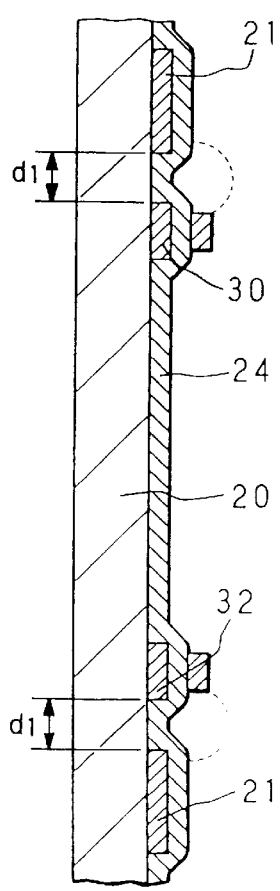
FIG. 13B is a sectional view viewed along a line 13B—13B in FIG. 13A
Figure 13C:
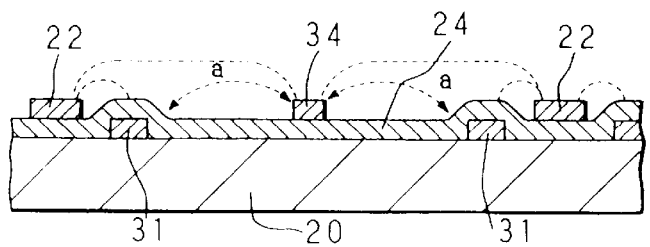
FIG. 13C is a sectional view viewed along a line 13C—13C in FIG. 13A.

In the conventional type structure shown in FIGS. 13A to 13C, as the turbulence of an electric field by the source wiring 22 cannot be shielded, an adverse effect such as cross talk upon display is required to be prevented by thickening the common electrode 31 for example. In the structure in this embodiment, as the magnetic field of the source wiring 84 can be shielded by the shading part 86b of the common electrode 86 and a leakage magnetic field can be removed, the common electrode 86 can be thinned, compared with that in the conventional type structure and effect of improving the numerical aperture can be obtained. In the structure in the second embodiment, as the common electrode 86 is provided closer to liquid crystal than the other layer and the pixel electrode 83 is provided on the isolating layer 82, an electric field can be generated closer to liquid crystal 42 than in the structure in the first embodiment shown in FIGS. 1A and 1B and an electric field can be let to act more strongly, the structure in this embodiment is preferable to the structure in the first embodiment shown in FIGS. 1A and 1B as to driving liquid crystal.

Next, if the common electrode 86 is formed by a shading conductive film in the structure shown in FIGS. 4A to 4C, shading is enabled by the common electrode 86 and therefore, a black matrix on the side of the opposite substrate can be omitted.

Figure 5:
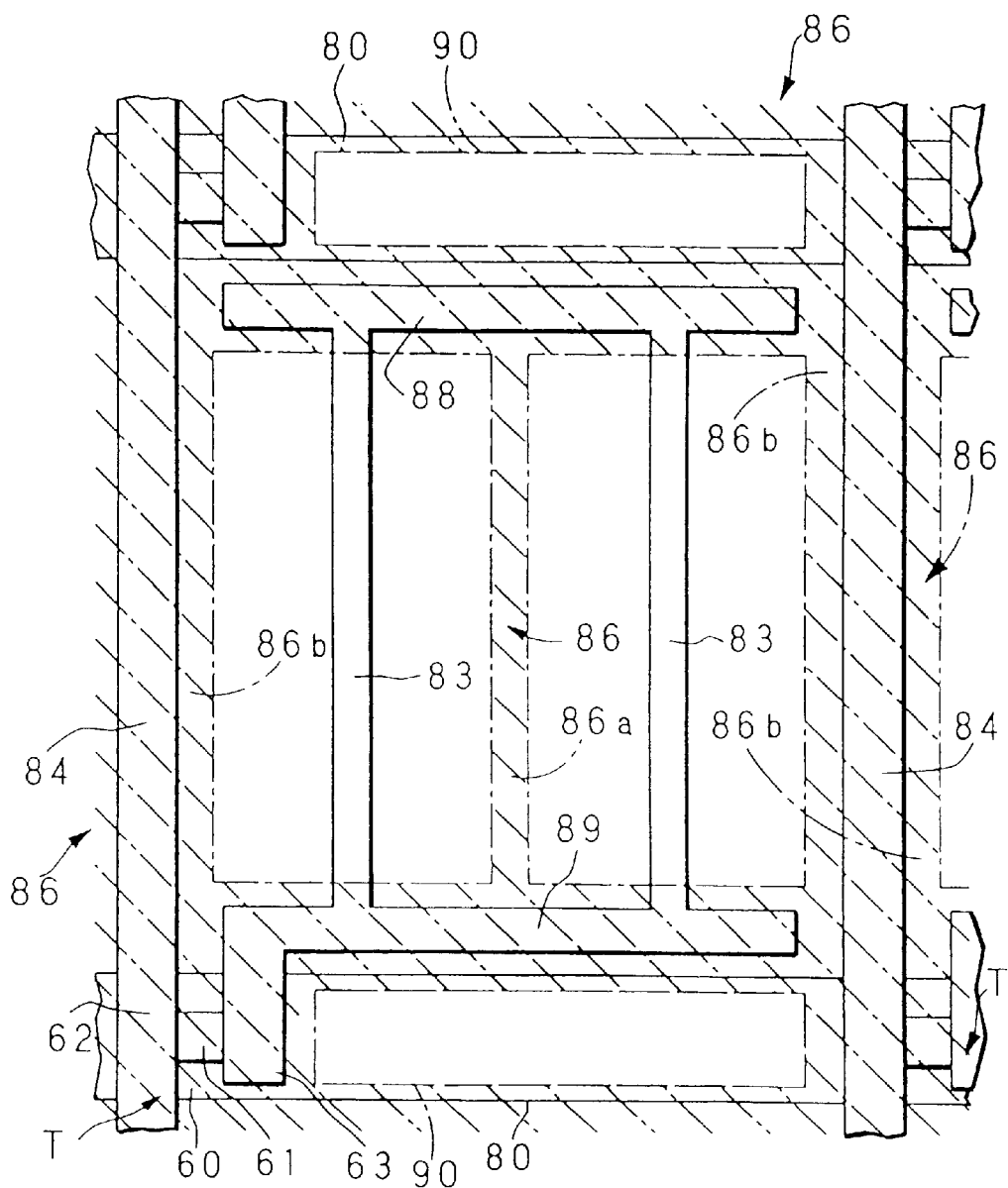
FIG. 5 is a plan showing a third embodiment of the liquid crystal display according to the present invention.

FIG. 5 shows the main part of a liquid crystal display equivalent to a third embodiment of the present invention and as the same reference numbers are allocated to the same parts in FIG. 5 as those in the liquid crystal display equivalent to the second embodiment shown in FIGS. 4A to 4C, the description of them is omitted.

This embodiment is characterized in that a rectangular hole 90 along the gate wiring 80 is provided in a part of the common electrode 86 located on the gate wiring 80. As the hole 90 is provided in the common electrode 86 on the gate wiring 80 as described above, the area of the isolating layers 82 and 85 held between the common electrode 86 and the gate wiring 80 is reduced and as generated capacity is reduced, parasitic capacity as a liquid crystal display can be reduced and delay at a gate can be prevented.

Further, in the structure in this embodiment, as the numerical aperture can be enhanced by reducing the turbulence of the orientation of liquid crystal in an area corresponding to the shading layer 86b of the common electrode 86 as in the second embodiment and widening the opening 70 of the black matrix 71, the power consumption of a back light can be reduced and lighter display can be obtained.

Next, as light can be shaded by the common electrode 86 in case the common electrode 86 is formed by a shading conductive film in the structure shown in FIG. 5, a black matrix on the side of the opposite substrate can be omitted. In this case, as light may leak from the hole 90 in case the hole is provided, the gate wiring 80 is required to be formed by a shading conductive film to prevent light from leaking.

Figure 6A:
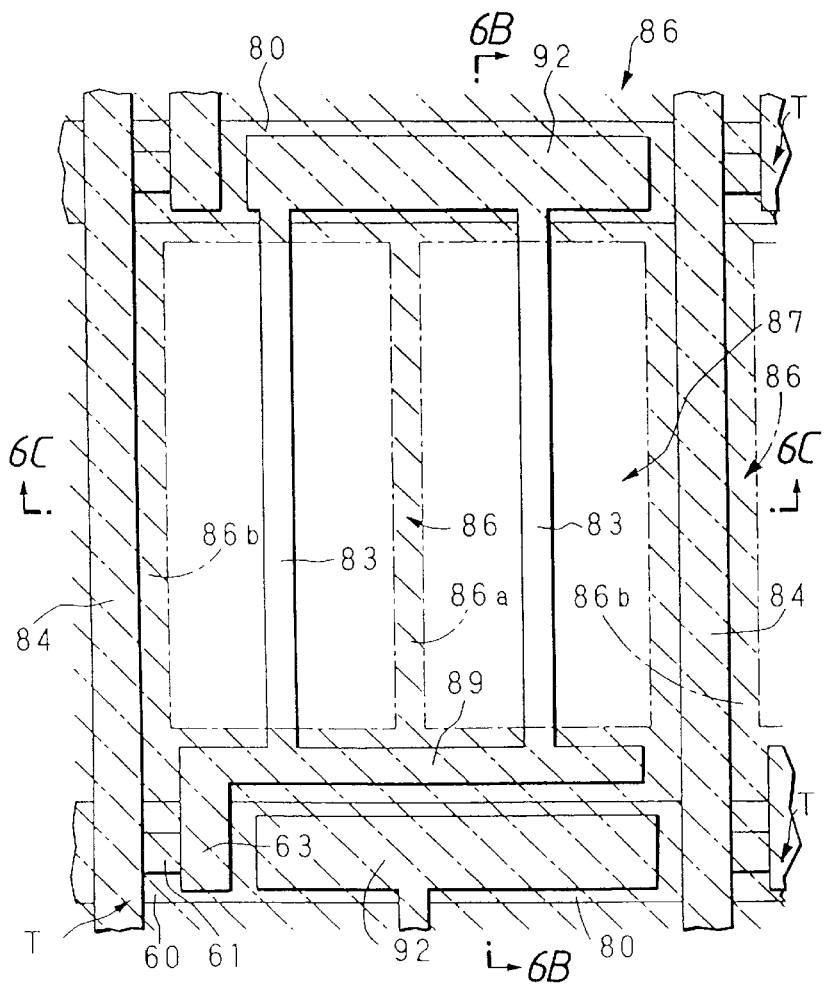
Figure 6B:
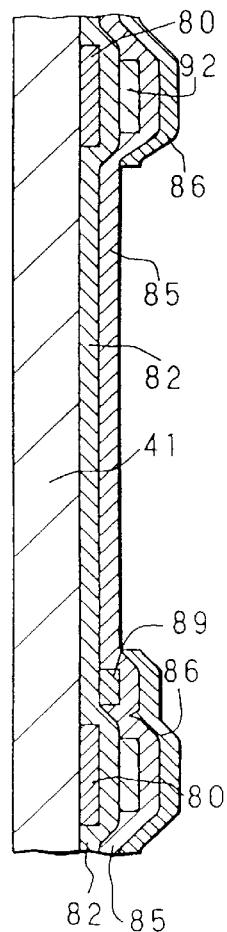
Figure 6C:
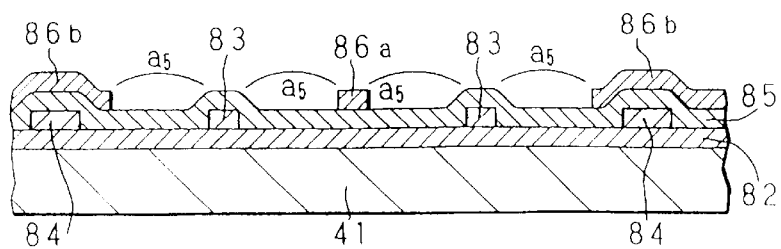

FIGS. 6A to 6C show the mainpart of a liquid crystal display equivalent to a fourth embodiment of the present invention and as the same reference numbers are allocated to the same parts in FIG. 6 as those in the liquid crystal display equivalent to the second embodiment shown in FIGS. 4A to 4C, the description of them is omitted.

The liquid crystal display equivalent to this embodiment is different from the liquid crystal display equivalent to the second embodiment in that a capacity generating electrode is not provided next to the gate wiring 80 and on the side of the pixel area 87 but the pixel electrodes 83 pass a position in which the capacity generating electrode 88 is provided in the second embodiment and are extended to a position on the gate wiring 80 and a rectangular capacity generating electrode 92 is provided over the gate wiring 80 via the isolating layers 82 and 85.

As the similar effect to effect in the structure in the second embodiment described referring to FIGS. 4A to 4C can be obtained by adopting the structure in this embodiment, moreover, the pixel electrodes 83 and the electrode part 86a of the common electrode 86 are also provided in a location in which the capacity generating electrode 88 is provided in the second embodiment and the area can be also used for display, the numerical aperture can be further more enhanced than that in the structures in the second and third embodiments. Further, as capacity is secured by providing the capacity generating electrode 92 connected to the pixel electrode 83 over the gate wiring 80 via the isolating layer 82 as shown in sectional structure in FIG. 6B and double capacity structure in which the common electrode 86 is further provided over the capacity generating electrode 92 via the isolating layer 85 is formed, the thickness of each electrode for generating capacity can be reduced if capacity to be generated is similar to that in the structures in the other embodiments, the pixel area 87 can be widened by the quantity and the numerical aperture can be enhanced by the quantity.

As approximately twice as much electrostatic capacity as electrostatic capacity in the structures in the other embodiments is secured if the thickness of the capacity generating electrode is approximately equal to that in the structures in the other embodiments, display performance as a liquid crystal display can be enhanced such that the retention of voltage can be increased, the contrast can be increased, the asymmetry of signals in case liquid crystal is driven by alternating current can be more inhibited and a flicker and burning can be reduced.

Figure 7:
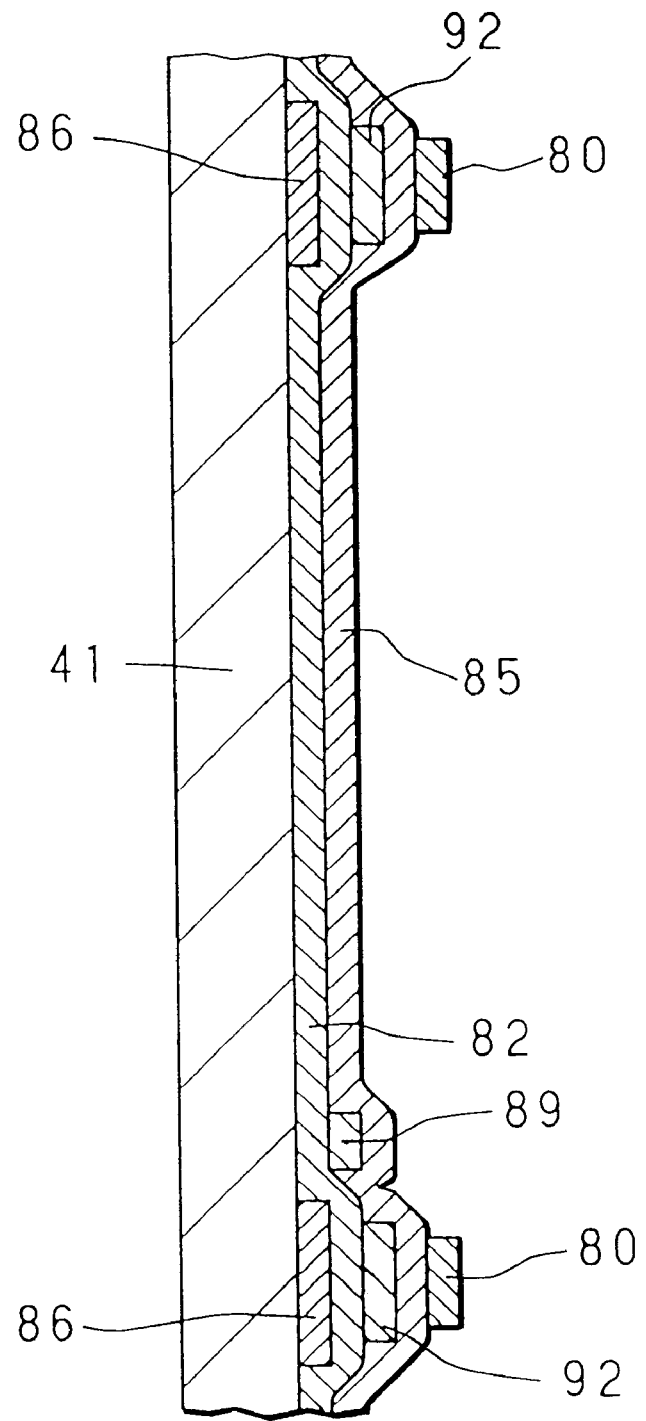
FIG. 7 is a sectional view showing a fifth embodiment of the liquid crystal display according to the present invention.

As another embodiment of double capacity structure in which capacity is secured by providing the capacity generating electrode 92 connected to the pixel electrode 83 over the gate wiring 80 via the isolating layer 82 and the common electrode 86 is further provided over the capacity generating electrode 92 via the isolating layer 85 as shown in FIG. 6B, structure shown in FIG. 7 may be also adopted.

FIG. 7 shows main sectional structure in a fifth embodiment of the present invention in which top gate structure is applied as the double capacity structure, concretely, the common electrode 86 is provided on the substrate 41, the isolating layer 82 covers them, the pixel electrode 92, a capacity electrode part and others are provided on the isolating layer 82, the isolating layer 85 is provided on them, the gate wiring 80 is further provided on the isolating layer and if the structure in this embodiment is used, the similar effect to that in the fourth embodiment can be also obtained.

As the structure in this embodiment is a lamination similar to the lamination of the thin film transistor array substrate of a liquid crystal display driven by a thin film transistor provided with normal top gate structure which is not driven by a lateral electric field and provided with an electrode on the upper and lower substrates, the liquid crystal displays equivalent to this embodiment can be readily manufactured using a manufacturing line for the conventional type liquid crystal display provided with top gate structure.

Figure 8A:
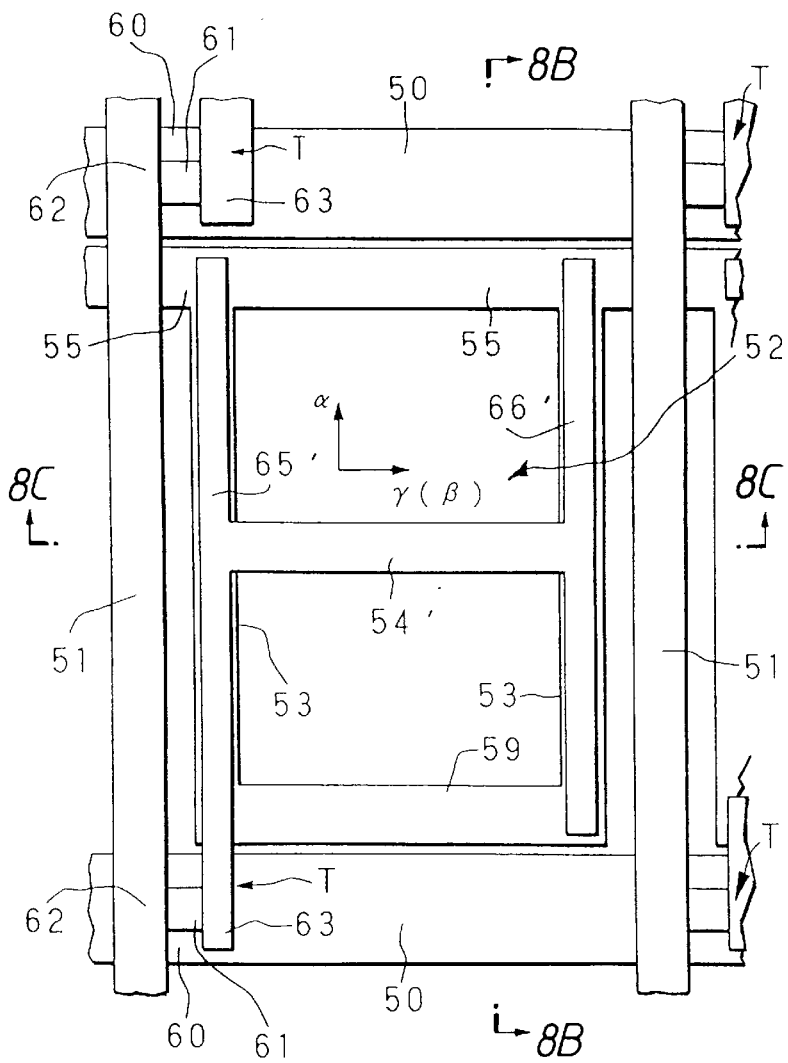
Figure 8B:
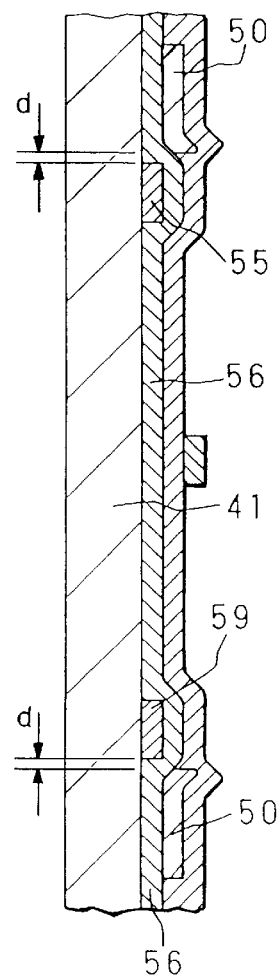
Figure 8C:
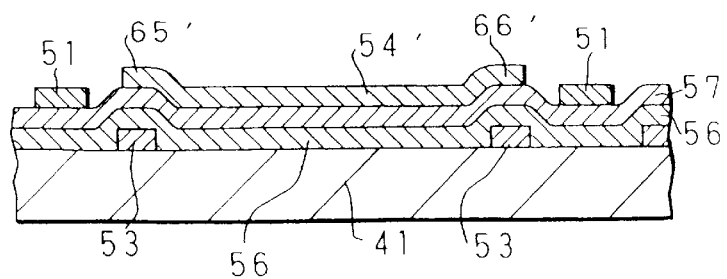
Figure 9:
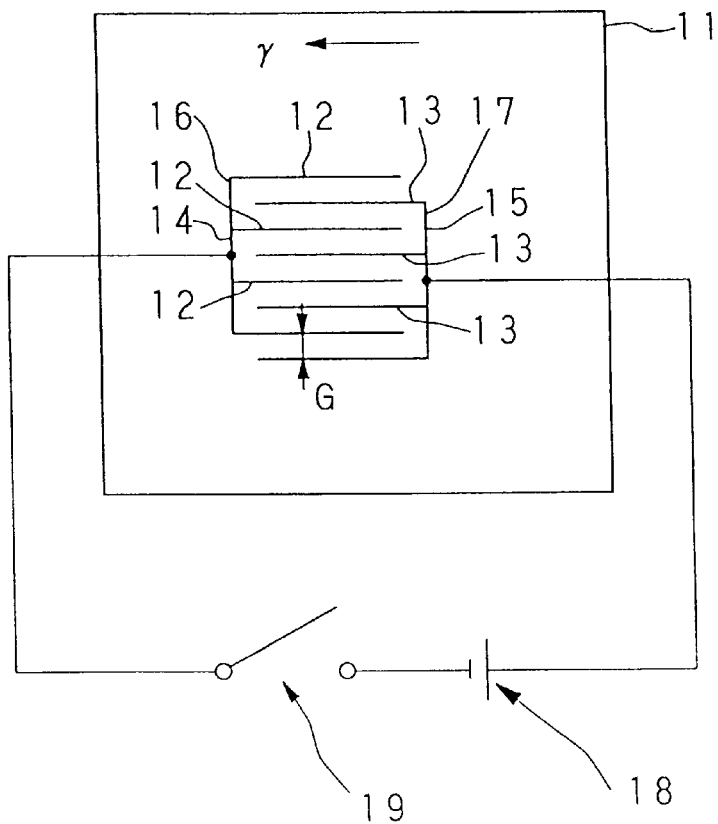
FIG. 9 is a plan showing a substrate provided with linear electrodes of a liquid crystal display developed formerly and according to a method of applying a lateral electric field.
Figure 10:
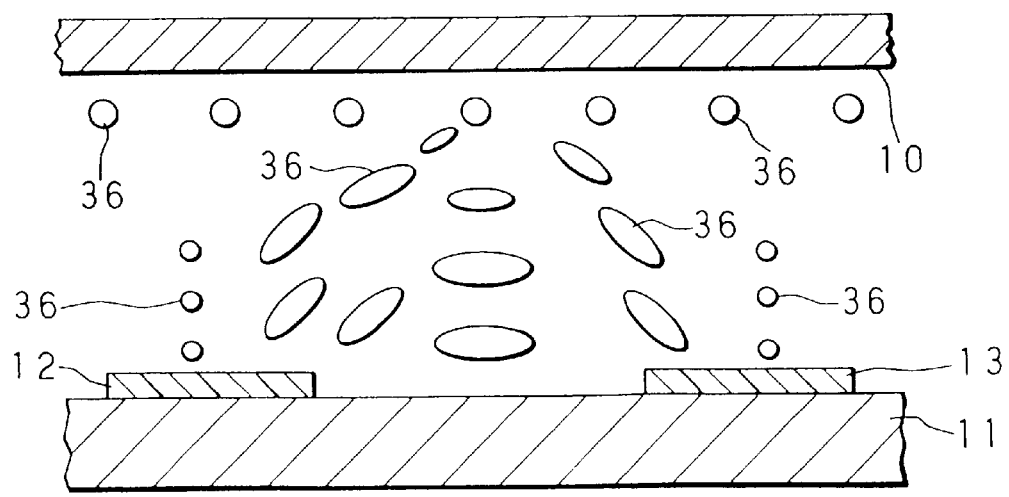
FIG. 10 is a sectional view showing the state of the orientation of liquid crystal molecules in case voltage is applied to the linear electrodes shown in FIG. 9.

FIGS. 8A to 8C show the mainpart of a liquid crystal display equivalent to a sixth embodiment of the present invention and as the same reference numbers are allocated to the same parts in FIGS. 8A to 8C as the parts in the liquid crystal display equivalent to the first embodiment shown in FIGS. 1 to 3, the description of them is omitted.

The structure of this embodiment is different from that of the first embodiment in the structure of a pixel electrode. In this embodiment, a pixel electrode 54' is arranged in the center of a pixel area in parallel with the common electrode wiring 55, a capacity generating electrode 65' is arranged on the common electrode 53 on one side along the source wiring 51 and a capacity generating electrode 66' is provided on the common electrode 53 on the other side along the source wiring 51.

In the structure in this embodiment, as an electric field is generated between the pixel electrode 54' and the common electrode wiring 55 and between the pixel electrode 54' and the common electrode connection 59, the orientation of liquid crystal is different from that in the structure in the first embodiment by 90°. Therefore, orientation in orientation processing for an orientation film in the structure in this embodiment is orientation different from that in the structure in the first embodiment by 90°, that is, orientation parallel to the common electrode wiring 55.

In the structure in the embodiment shown in FIGS. 8A to 8C, the orientation of liquid crystal is also controlled as in the first embodiment and the other action and effect are the same except that the homogeneous orientation of liquid crystal molecules described referring to FIGS. 11A and 11B when no electric field is applied is different from that in the first embodiment by 90° and the orientation of liquid crystal twisted along the orientation of an electric field in the orientation of liquid crystal molecules when an electric field is applied is different from that in the case shown in FIG. 12 by 90°.

As the capacity generating electrodes 65' and 66' can be formed so that they are longer than them in the case shown in FIGS. 1A and 1B in which they are formed along the common electrode wiring 55 in the embodiment shown in FIGS. 8A to 8C because the capacity generating electrodes can be formed along the common electrode 53 in the embodiment shown in FIGS. 8A to 8C, this embodiment is characterized in that larger capacity can be secured.

EXAMPLES

A thin film transistor-type liquid crystal display provided with a circuit with the structure shown in FIG. 1A is manufactured.

A liquid crystal cell is assembled by using two transparent glass substrates 1 mm thick, forming a thin film transistor circuit provided with linear electrodes shown in FIGS. 1A and 1B on either of these substrates, forming an orientation film on the above thin film transistor circuit, forming an orientation film on the other substrate, applying orientation processing for orienting liquid crystal to the respective orientation films by rubbing, injecting liquid crystal into clearance between the substrates with the two substrates arranged opposite at a predetermined interval via beads for forming a gap, sealing by sealant and arranging a polarizing plate outside each substrate. In the above structure, orientation processing in which a rubbing roll is rubbed on the respective orientation films in a direction parallel with the longitudinal direction of a pixel electrode is executed.

To manufacture the above display in this example, the pitch of a pixel area in a lateral direction (in a direction parallel with a gate wiring) is set to 70 $\mu$m and the pitch in a longitudinal direction (in a direction parallel with a source wiring) is set to 50 $\mu$m.

The width of a pixel electrode is set to 3 $\mu$m, the width of a common electrode is set to 4 $\mu$m, an interval between the pixel electrode and the common electrode is set to 14 $\mu$m an interval between the gate wiring and a common electrode wiring when viewed from the top is set to 1 $\mu$m and the thickness of an $SiN_x$ film for separating the gate wiring and the common electrode wiring is set to 0.3 $\mu$m.

A thin film transistor array substrate is formed by forming a thin film transistor with structure in which a semiconductor film composed of a-Si is held between the gate electrode and a source electrode in the vicinity of the intersection of the gate wiring and a signal wiring, further covering the thin film transistor with an insulating layer, further forming an orientation film composed of polyimide and executing orientation processing using a rubbing roll. Next, a liquid crystal display is manufactured by using a substrate on which a black matrix, a color filter and a polyimide orientation film are provided as a substrate on the opposite side of the above substrate and sealing liquid crystal filled in a gap 4 μm thick between the substrates by sealant.

The numerical aperture of the liquid crystal display manufactured as described above can be enhanced up to 37% and the gate wiring and the common electrode wiring are never short-circuited.

In the meantime, in a liquid crystal display for comparison with the structure shown in FIG. 13A, the pitch of a pixel area in a lateral direction (in a direction parallel with a gate wiring) is set to 70 μm and the pitch in a longitudinal direction (in a direction parallel with a source wiring) is set to 50 μm.

The width of a pixel electrode is set to 3 μm, the width of a common electrode is set to 4 μm, an interval between the pixel electrode and the common electrode is set to 14 μm, an interval between the gate wiring and a common electrode wiring when viewed from the top is set to 5 μm and the thickness of an $SiN_x$ film for covering the gate wiring and the common electrode wiring is set to 0.3 μm. The numerical aperture of the liquid crystal display manufactured as described above is 30% and the gate wiring and the common electrode wiring are never short-circuited. However, when the display for comparison is manufactured at an interval between the gate wiring and the common electrode wiring when viewed from the top of 1 μm as in the display in the above example, the gate wiring and the common electrode wiring are short-circuited and the display cannot be actually used.

Next, a liquid crystal display with electrode structure shown in FIGS. 4A to 4C and a liquid crystal display with electrode structure shown in FIGS. 6A to 6C are manufactured.

The pitch of a pixel area in the above displays is equal to the pitch in above example, however, as a shading part in the vicinity of a source wiring is thinned and an opening can be widened in the structure shown in FIGS. 4A to 4C, the numerical aperture can be enhanced up to 50% and as the longitudinal length of an opening can be extended up to 51 μm in the structure shown in FIGS. 6A to 6C though the longitudinal length of the opening is 44 μm in FIGS. 4A to 4C, the numerical aperture can be enhanced up to 58%.

As described above, according to the present invention, as the gate wiring and the common electrode are provided in separate layers on the substrate via the insulating layer in the liquid crystal display which controls the orientation of liquid crystal by applying a lateral electric field in a direction parallel with the substrate by the common electrode and the pixel electrode, the gate wiring and the common electrode can be arranged closer when viewed from the top, compared with the conventional type structure which is structure in the same layer and hereby, as a gap between the gate wiring and the common electrode can be reduced when viewed from the top, the numerical aperture can be enhanced.

Therefore, a liquid crystal display according to a method of controlling the orientation of liquid crystal and switching a light state and a dark state depending upon whether a lateral electric field is applied or not, provided with a characteristic of a wide angle of visibility and further, a high numerical aperture can be provided.

Next, according to the present invention, as capacity can be secured in a part between a pixel electrode part along the gate wiring and a common electrode part or in a part between a pixel electrode part along the source wiring and the common electrode part if the electrode part along the gate wiring of the pixel electrode and the electrode part along the gate wiring of the common electrode are overlapped or the electrode part along the source wiring of the pixel electrode and the electrode part along the source wiring of the common electrode are overlapped, such capacity can be utilized for the improvement of the liquid crystal driving performance of the liquid crystal display as storage capacity.

Constitution in which the gate wiring and the common electrode are not arranged close as described above but partly overlapped when viewed from the top may be also adopted and in the above structure, the numerical aperture can be further enhanced.

Therefore, a liquid crystal display according to a method of controlling the orientation of liquid crystal and switching a light state and a dark state depending upon whether a lateral electric field is applied or not, provided with a characteristic of a wide angle of visibility and further, a higher numerical aperture can be provided.

Further, according to the present invention, as capacity can be secured in a part in which a pixel electrode part along the gate wiring and a gate wiring part are overlapped or in a part in which the pixel electrode part along the gate wiring and an electrode part along the gate wiring of the common electrode are overlapped if a part in which the common electrode and the gate wiring are overlapped is formed in the electrode part along the gate wiring of the pixel electrode or the electrode part along the gate wiring of the pixel electrode is overlapped with the electrode part along the gate wiring of the common electrode, such capacity can be utilized for the improvement of the liquid crystal driving performance of the liquid crystal display as storage capacity.

What is claimed is:

1. An active matrix liquid crystal display, comprising:

liquid crystal arranged between a pair of substrates;

a plurality of gate wirings and a plurality of source wirings provided orthogonal to each other on a surface of one of said substrates;

a thin film transistor provided in the vicinity of an intersection of each of said gate wirings and each of said source wirings;

a pixel electrode driven by said thin film transistor;

a common electrode for applying a lateral electric field to said liquid crystal in a direction along said substrate surface in cooperation with said pixel electrode, thereby forming a plurality of pixel regions;

a first insulating layer provided between said common electrode and said gate wiring, said gate wiring provided above said common electrode; and a second insulating layer provided between said pixel electrode and said gate wiring, wherein:

said common electrode includes a first common electrode portion extending in a direction parallel to a direction in which said gate wiring is extended, and a second common electrode portion extending in a direction parallel to a direction in which said source wiring is extended, said first common electrode portion being provided in the vicinity of said gate wiring, said pixel electrode includes a first pixel electrode portion extending in said direction parallel to said gate wiring extending direction, and a second pixel electrode portion extending said direction parallel to said source wiring extending direction, said first pixel electrode portion is formed above said first common electrode portion, and a boundary of said first pixel electrode portion is formed within a boundary of said first common electrode portion.

2. An active matrix liquid crystal display, comprising:

liquid crystal arranged between a pair of substrates;

a plurality of gate wirings and a plurality of source wirings provided orthogonal to each other on a surface of one of said substrates;

a thin film transistor provided in the vicinity of an intersection of each of said gate wirings and each of said source wirings;

a pixel electrode driven by said thin film transistor;

a common electrode for applying a lateral electric field to said liquid crystal in a direction along said substrate surface in cooperation with said pixel electrode, thereby forming a plurality of pixel regions;

a first insulating layer provided between said common electrode and said gate wiring, said gate wiring provided above said common electrode; and a second insulating layer provided between said pixel electrode and said gate wiring, wherein:

said common electrode includes a first common electrode portion extending in a direction parallel to a direction in which said gate wiring is extended, and a second common electrode portion extending in a direction parallel to a direction in which said source wiring is extended, said first common electrode portion being provided in the vicinity of said gate wiring, said pixel electrode includes a first pixel electrode portion extending in said direction parallel to said gate wiring extending direction, and a second pixel electrode portion extending said direction parallel to said source wiring extending direction, a boundary of said second pixel electrode portion is formed within a boundary of said second common electrode portion.

3. An active matrix liquid crystal display, comprising:

liquid crystal arranged between a pair of substrates;

a plurality of gate wirings and a plurality of source wirings provided orthogonal to each other on a surface of one of said substrates;

a thin film transistor provided in the vicinity of an intersection of each of said gate wirings and each of said source wirings;

a pixel electrode driven by said thin film transistor;

a common electrode for applying a lateral electric field to said liquid crystal in a direction along said substrate surface in cooperation with said pixel electrode, thereby forming a plurality of pixel regions; and an insulating layer structure provided between said common electrode and said gate wiring, said gate wiring provided above said common electrode;

wherein:

said common electrode includes a first common electrode portion extending in a direction parallel to a direction in which said gate wiring is extended, and a second common electrode portion extending in a direction parallel to a direction in which said source wiring is extended, said first common electrode portion being provided in the vicinity of said gate wiring, said pixel electrode includes a first pixel electrode portion extending in said direction parallel to said gate wiring extending direction, and a second pixel electrode portion extending said direction parallel to said source wiring extending direction, and said first common electrode overlaps said gate wiring.

4. An active matrix liquid crystal display according to claim 3, wherein:

said insulating layer structure includes an upper insulating layer and a lower insulating layer, said pixel electrode is provided between the upper insulating layer and lower insulating layers; and said first pixel electrode portion overlaps said gate wiring.

5. An active matrix liquid crystal display according to claim 3, wherein:

said insulating layer structure includes an upper insulating layer and a lower insulating layer, said pixel electrode is provided between the upper insulating layer and lower insulating layers; and said first pixel electrode portion overlaps said first common electrode.

6. An active matrix liquid crystal display according to claim 3, wherein a rectangular hole disposed along said gate wiring is provided for said first common electrode portion having the overlapping portion with said gate wiring.

* * * * *

UNITED STATES PATENT AND TRADEMARK OFFICE
CERTIFICATE OF CORRECTION

PATENT NO. : 6,091,473
DATED      : July 18, 2000
INVENTOR(S) : Jebiguchi, Hiroyuki It is certified that error appears in the above-identified patent and that said Letters Patent is hereby corrected as shown below:

Title page, item [73], Assignee: "change "Alps Electric Co., Ltd., Tokyo, Japan" to --Frontec Incorporated, Miyagi-ken, Japan --

Signed and Sealed this

Fifth Day of December, 2000

Attest:

Q. TODD DICKINSON

*Attesting Officer*     *Director of Patents and Trademarks*